(12) United States Patent
Arno et al.

(10) Patent No.: US 6,423,284 B1
(45) Date of Patent: Jul. 23, 2002

(54) FLUORINE ABATEMENT USING STEAM INJECTION IN OXIDATION TREATMENT OF SEMICONDUCTOR MANUFACTURING EFFLUENT GASES

(75) Inventors: Jose L. Arno, Brookfield, CT (US); Robert M. Vermeulen, Pleasant Hill, CA (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/420,080

(22) Filed: Oct. 18, 1999

(51) Int. Cl.[7] .................................................. C01B 7/00
(52) U.S. Cl. .................................................. 423/240 R
(58) Field of Search ............................. 423/210, 240 R, 423/241, 215.5; 588/248

(56) References Cited

U.S. PATENT DOCUMENTS

| | | | |
|---|---|---|---|
| 3,898,040 A | | 8/1975 | Tabak |
| 4,083,607 A | | 4/1978 | Mott |
| 4,519,999 A | | 5/1985 | Coleman |
| 4,661,056 A | | 4/1987 | Vickery et al. |
| 4,719,088 A | | 1/1988 | Itoh et al. |
| 4,886,444 A | | 12/1989 | Hirase et al. |
| 4,908,191 A | | 3/1990 | Boldish et al. |
| 4,986,838 A | | 1/1991 | Johnsgard |
| 5,009,869 A | | 4/1991 | Weinberg et al. |
| 5,045,288 A | * | 9/1991 | Raupp et al. ............. 422/186.3 |

(List continued on next page.)

FOREIGN PATENT DOCUMENTS

| | | |
|---|---|---|
| JP | 59082927 | 5/1984 |
| JP | 03-65218 | 3/1991 |
| JP | 07-10335 | 10/1992 |
| JP | 04-209524 | 10/1992 |
| JP | 11276860 | 10/1999 |
| WO | WO 9616720 | 6/1996 |
| WO | WO 99/02921 | 1/1999 |

OTHER PUBLICATIONS

US 5,620,653, 04/1997, Jain et al. (withdrawn)
Langan, J., "Strategies for Greenhouse Gas Reduction", *Solid State Technology* Jul. 1996, 115.
Holmes, J.T., et al., "Fluidized Bed Disposal of Fluorine", *I&EC Process Design and Development*, vol. 6, No. 4, p. 411 (1967).
Cady, G. H., "Reaction of Fluorine with Water and with Hydroxides", *J. Am. Chem. Soc.* vol. 57, p. 246, (1935).
Smiley, S.H. et al., "Continuous Disposal of Fluorine", *Industrial and Engineering Chemistry*, vol. 46, p. 244 (1954).

(List continued on next page.)

*Primary Examiner*—Steven P. Griffin
*Assistant Examiner*—Edward M. Johnson
(74) *Attorney, Agent, or Firm*—Oliver A. Zitzmann; Steven J. Hultquist; Margaret Chappuis

(57) ABSTRACT

An apparatus and process for abatement of halogen in a halogen-containing effluent gas, such as is produced by a semiconductor manufacturing plant utilizing perfluorocompounds in the operation of the plant. Halogen-containing effluent gas is contacted with water vapor in a thermal oxidation reactor to convert halogen species to reaction products that are readily removed from the effluent gas by subsequent scrubbing. A shrouding gas may be employed to separate the halogen-containing effluent gas from the water vapor at the inlet of the thermal oxidation reactor, to thereby prevent premature reaction that would otherwise produce particulates and reaction products that could clog the inlet of the reactor.

23 Claims, 4 Drawing Sheets

U.S. PATENT DOCUMENTS

| | | | |
|---|---|---|---|
| 5,123,836 A | * | 6/1992 | Yoneda et al. ............... 431/5 |
| 5,160,707 A | | 11/1992 | Murray et al. |
| 5,183,646 A | | 2/1993 | Anderson et al. |
| 5,238,656 A | | 8/1993 | Tajima et al. |
| 5,252,007 A | | 10/1993 | Klinzing |
| 5,271,908 A | | 12/1993 | Shiban et al. |
| 5,407,647 A | | 4/1995 | Tarancon |
| 5,510,093 A | | 4/1996 | Bartz et al. |
| 5,533,890 A | | 7/1996 | Holst et al. |
| 5,599,508 A | | 2/1997 | Martinelli |
| 5,603,905 A | | 2/1997 | Bartz e tal. |
| 5,649,985 A | | 7/1997 | Imamura |
| 5,650,128 A | * | 7/1997 | Holst et al. ............. 423/240 R |
| 5,665,317 A | | 9/1997 | Laslo |
| 5,693,293 A | | 12/1997 | Reichardt et al. |
| 5,716,428 A | | 2/1998 | Imamura |
| 5,756,052 A | | 5/1998 | Suzumura |
| 5,779,998 A | * | 7/1998 | Tom ........................ 423/210 |
| 5,800,792 A | | 9/1998 | Ibaraki et al. |
| 5,891,404 A | | 4/1999 | Ibaraki et al. |
| 5,900,217 A | | 5/1999 | Hartung et al. |
| 5,914,091 A | | 6/1999 | Holst et al. |
| 5,955,037 A | | 9/1999 | Holst et al. |

OTHER PUBLICATIONS

Streng A.G., "The Fluorine–Steam Flame and Its Characteristics", *Combustion Flame*, vol. 6, p. 89 (1962).

Hardwick, Steven J., et al., "Waste minimization in semiconductor processing", Mater. Res. Soc. Symp. Proc., 344, p. 273, (1994).

Hayakawa, Saburo, "Silane Gas Scrubber", Koastsu Gasu, 24(7), p. 371–9, (1987).

U.S. application No. 09/228,706, Moore et al., filed Jan. 12, 1999.

* cited by examiner

FLUORINE ABATEMENT USING STEAM INJECTION IN OXIDATION TREATMENT OF SEMICONDUCTOR MANUFACTURING EFFLUENT GASES

BACKGROUND OF THE INVENTION

1. Field of the Invention

The present invention generally relates to an effluent abatement system for the treatment of gas streams from processes such as manufacturing of semiconductor materials, devices and products. The invention relates more specifically to abatement of halogens such as fluorine and fluorinated chemical species, by reaction thereof with water vapor during thermal oxidation treatment of a halogen-containing effluent gas.

2. Description of the Related Art

Gaseous effluents from the manufacture of semiconductor materials, devices, products and memory articles may contain a wide variety of chemical species from the process facility. These chemical species include inorganic and organic compounds, breakdown products of photo-resist and other reagents, and a wide variety of other gases that must be removed from the waste gas streams before being vented from the process facility into the atmosphere.

The effluent gas in such instances may be subjected to any of a wide variety of treatments to abate the various undesirable components of the gas. Such effluent gas treatment may for example include scrubbing of the effluent gas to remove acid gas components and/or particulates from the gas stream. The gas may also be thermally oxidized to remove organic components and other oxidizable components, by mixing the effluent with an oxidant, such as high purity oxygen, air or nitrous oxide, and flowing the resulting gas mixture through a thermal oxidation reaction chamber.

In such effluent treatment systems, halogens, e.g., fluorine ($F_2$) and fluorinated compounds are particularly problematic among the various components requiring abatement. The electronics industry uses perfluorinated compounds (PFCs) in wafer processing tools to remove residue from deposition steps and to etch thin films. PFCs are recognized to be strong contributors to global warming and the electronics industry is working to reduce the emissions of these gases.

The most commonly used PFCs include $CF_4$, $C_2F_6$, $SF_6$, $C_3F_8$, and $NF_3$. These PFCs are dissociated in a plasma to generate highly reactive $F_2$ and fluorine radicals, which do the actual cleaning, and etching. The products from these processing operations include mostly fluorine, silicon tetrafluoride ($SiF_4$), and to a lesser extent hydrogen fluoride (HF) and carbonyl fluoride ($COF_2$). The toxic nature of these gases poses considerable health and environmental hazards, in addition to being highly corrosive to exhaust systems.

Optimization of the operating conditions in the semiconductor manufacturing process tool to increase the conversion efficiencies (of PFCs to end products) has been the primary focus in reducing PFC emissions. An example of this approach is the Applied Materials HDP-CVD process. The improvements that have been made in PFC conversions by process optimization has enabled the use of shorter clean cycles to be achieved, and consequently higher wafer throughputs to be obtained.

The current trend in the semiconductor manufacturing industry to 300mm wafer manufacturing will increase the amounts of PFCs used in semiconductor manufacturing facilities. The increase in usage of PFCs and their conversion to highly reactive products have led to an increase in the corrosion rate of the abatement equipment and associated exhaust ductwork. In particular the corrosion attributable to fluorine has necessitated more frequent replacement of equipment components upstream of the typically employed wet scrubber unit in the effluent treatment system.

A number of reagents have been used for reaction with PFCs to convert them to compounds that are less corrosive, can easily be scrubbed from the exhaust stream, or pose less of a danger to health and the environment. For example, hydrogen ($H_2$) can be introduced as a reagent to convert the fluorine to HF, which can then be removed using a wet scrubber. Hydrogen, however, poses a potential problem due to its explosive nature, and hydrogen has been banned from some semiconductor processing operations because of this danger.

As a result of the explosive hazard associated with $H_2$, other reagents can be dissociated to provide hydrogen to abate the $F_2$. Methane ($CH_4$) can be employed to abate fluorine and fluorinated species by combustion thereof using added air or oxygen ($O_2$). The water vapor and reactive hydrogen produced from this combustion react with the $F_2$ and fluorinated species to convert them to HF and $SiO_2$, which can then be readily removed from the exhaust stream.

Methane is not as explosive as $H_2$, but suffers from other problems. The combustion of $CH_4$ at high temperatures in the presence of oxygen produces oxides of nitrogen ($NO_x$). Under combustion conditions where insufficient oxygen is present, the $CH_4$ can be converted to fluorine substituted methanes (of the formula $CH_xF_y$, wherein x and y may range from 0 to 4). These fluoromethanes are of concern because of their strong global warming potential.

Both anhydrous ammonia ($NH_3$) and aqueous ammonia ($NH_4OH$) can also be used as reagents for $F_2$ abatement. Ammonia increases the cost of ownership for the effluent treatment system in which it is used, and thus has a corresponding economic disadvantage. Further, the presence of ammonia can be a factor in the generation of oxygen difluoride if pH is not rigorously controlled in the effluent treatment system.

It would therefore be an advance in the art to provide a method of abatement of fluorine and other halogen species, which overcomes the various above-described deficiencies of the prior art.

SUMMARY OF THE INVENTION

The present invention relates to the abatement of halogen in a halogen-containing effluent gas stream.

In one aspect, the invention relates to an apparatus for treating the effluent fluid stream from one or more semiconductor manufacturing process tools, comprising:

an oxidizing unit having one or more inlet units at one end, downstream from at least one semiconductor manufacturing process tool, arranged to elevate the temperature of the effluent fluid stream, effect oxidation of at least a portion of the oxidizable components of the effluent fluid stream, and utilize water vapor to effect conversion of at least a portion of the halogen-containing components of the effluent fluid stream at the inlet end.

Such apparatus may in one embodiment further include a post-treatment unit, downstream from the oxidizing unit, arranged to remove acidic components from the effluent fluid stream.

Another aspect of the invention relates to a thermal oxidation reactor for abatement of oxidizable halogen components in an effluent gas, such thermal oxidation reactor comprising: a housing defining a flow passage therein for flow of effluent gas therethrough; an inlet coupled to the housing for introduction of effluent gas to the central flow passage, such inlet comprising (1) a shrouding gas flow passage arranged to flow shrouding gas into the central flow passage cocurrently with the effluent gas and surrounding the effluent gas, and (2) a reagent gas flow passage arranged to flow a reagent gas into the central flow passage cocurrently with the shrouding gas and surrounding the shrouding gas, wherein the reagent gas is reactive with halogen species in the effluent gas, with the central flow passage being of sufficient length downstream of the inlet to permit the reagent gas to mix and react with the halogen species of the effluent gas.

In one method aspect, the invention relates to a method for treating the effluent fluid stream from one or more semiconductor manufacturing process tools using a system that includes an oxidizing unit having one or more inlet units at one end, comprising the steps of:

providing water vapor to the inlet end of the oxidizing unit;

effecting, at the inlet end of the oxidizing unit, the conversion of at least a portion of the halogen-containing components of the effluent fluid stream to a form that is more treatable using such water vapor; and effecting, in the oxidizing unit, the oxidation of at least a portion of the oxidizable components of the effluent fluid stream.

The above-described method may further comprise in a particular embodiment the additional step of removing acidic components from the effluent fluid stream.

Another aspect of the invention relates to a method of thermally oxidizing a halogen-containing effluent gas in a thermal oxidation reactor including a gas flow path bounded by a liner susceptible to corrosion in exposure to halogen species in the halogen-containing effluent gas, such method comprising introducing the halogen-containing effluent gas into the thermal oxidation reactor and flowing water vapor between the introduced halogen-containing effluent gas and the liner to thereby protect the liner by reaction of the water vapor with the halogen species in the halogen-containing effluent gas.

Other aspects, features and embodiments will be fully apparent from the ensuing disclosure.

DETAILED DESCRIPTION OF THE INVENTION, AND PREFERRED EMBODIMENTS THEREOF

The disclosures of U.S. patent application Ser. No. 08/775,838 filed Dec. 31, 1996 in the names of Mark Holst, et al. for "Effluent Gas Stream Treatment System Having Utility for Oxidation Treatment of Semiconductor Manufacturing Effluent Gases," issued Sep. 21, 1999 as U.S. Pat. No. 5,955,037 and the disclosure of U.S. patent application Ser. No. 09/228,706 filed Jan. 12, 1999 in the names of Robert R. Moore, et al. for "Apparatus and Method for Controlled Decomposition of Gaseous Pollutants" are hereby incorporated herein by reference in their respective entireties.

The present invention utilizes the introduction of water vapor as a reagent in the thermal oxidation abatement treatment of halogen-containing gases, e.g., fluorine-containing gases. The use of water vapor for such oxidation treatment of the halogen-containing gas offers the advantage of providing a source of hydrogen to react with the halogen, in addition to having a lower impact on cost of ownership than other reagents that might be used. Introduction of the water vapor at the beginning of the thermal section of the effluent abatement system allows a maximum reaction time (relative to any downstream addition of water vapor) and by early reaction with the halogen components of the effluent gas serves to protect the sections of the abatement system that are most vulnerable to corrosion.

The thermal oxidation unit employed in the practice of the invention may be utilized in conjunction with an upstream pre-treatment unit (with the pre-treatment unit being downstream from one or more semiconductor process tools). The pre-treatment unit may be arranged to remove water-soluble components and particulates from the effluent gas, prior to treatment of the effluent gas in the thermal oxidation unit, wherein the halogen-containing components of the effluent stream are converted to a form that is more treatment, e.g., by post-oxidation treatment scrubbing, optionally with quenching of the effluent gas discharged from the thermal oxidation unit.

In the thermal oxidation unit, the introduced water vapor effects the conversion of diatomic halogens (e.g., $F_2$, $I_2$, $Cl_2$, $Br_2$) to their more readily treatable mineral acid form. The water vapor may be utilized to provide a hydrogen source to effect such conversion, heat to keep the surfaces in the oxidation unit above dewpoint and overcome the latent heat of vaporization of the water. Oxidation may be added to the effluent in or upstream of the oxidation unit, or the effluent may already contain an oxidizer medium deriving from its upstream source (semiconductor tool(s)).

Figure 1:
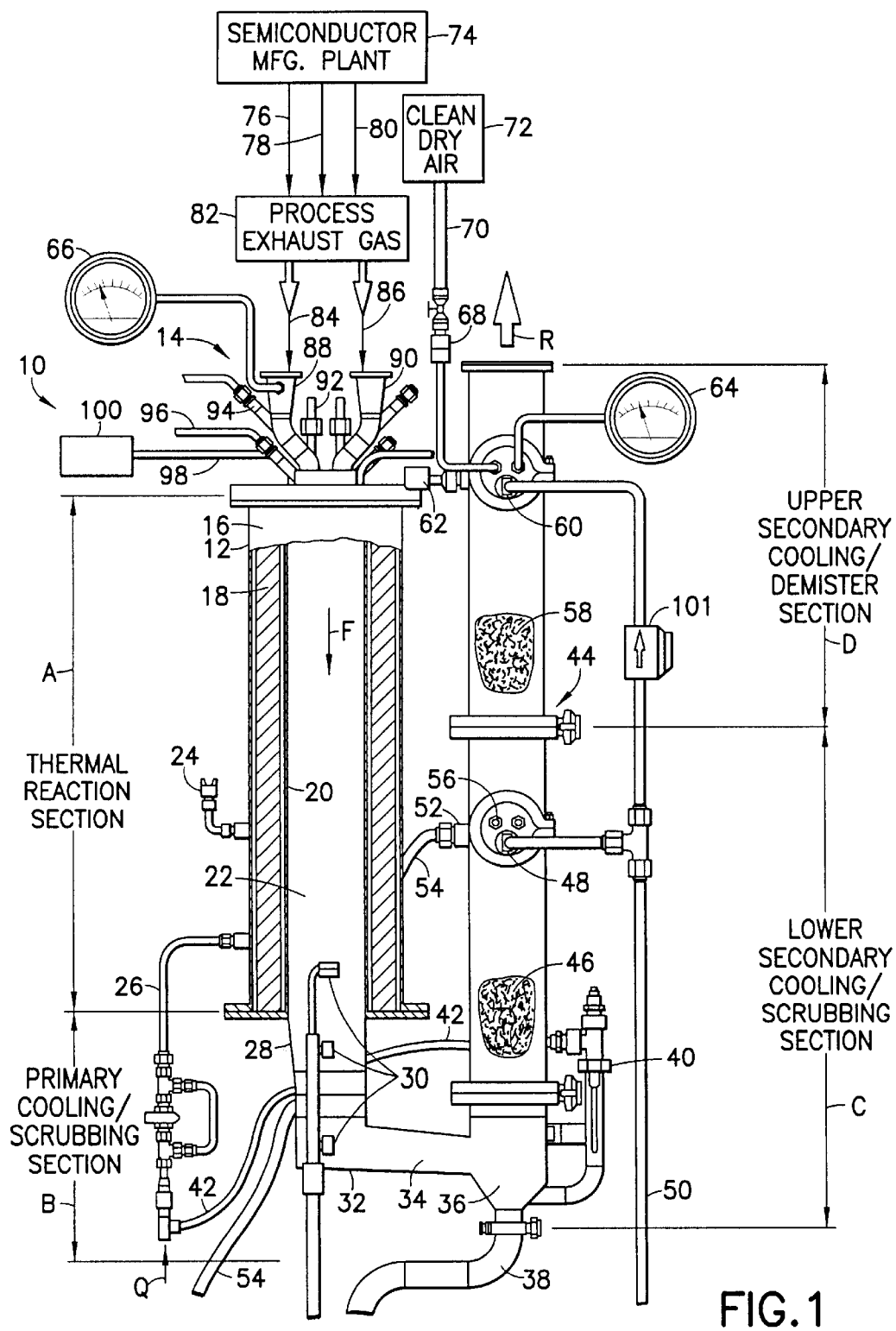
FIG. 1 is a schematic representation, in partial section, of an effluent abatement system receiving a halogen-containing effluent gas from a semiconductor manufacturing plant, according to one embodiment of the invention.

Referring now to the drawings, FIG. 1 is a schematic representation, in partial section, of an effluent abatement system 10 receiving a halogen-containing effluent gas from a semiconductor manufacturing plant 74, according to one embodiment of the invention.

The semiconductor manufacturing plant 74 may comprise semiconductor manufacturing process tools of any suitable type. For example, the semiconductor manufacturing process tools may comprise high density plasma chemical vapor deposition tools that use a remote plasma source to effect disassociation of fluorine from fluorine containing gases used during the cleaning process.

The effluent abatement system 10 includes main process section A–D, comprising thermal reaction section A, primary cooling/scrubbing section B, lower secondary cooling/scrubbing section C and upper secondary cooling/demister section D.

In the thermal reaction section A, the effluent abatement system 10 includes a thermal oxidation reactor 12, to which is joined an inlet assembly 14 for delivery of process gases and ancillary fluids to the reactor.

The thermal oxidation reactor 12 includes an exterior wall 16 and an interior wall 20 enclosing an annular heating element 18. The interior wall 20 encloses a central flow passage 22 of the reactor. The annular heating element may for example be electrically heated to provide a hot surface at the interior wall 20, for elevated temperature treatment of the effluent being treated. The inner wall 20, or "liner," may be formed of any suitable material, such as Inconel® metal alloy.

The thermal oxidation reactor 12, although illustratively shown as an electrically heated unit, may alternatively be of any suitable type. Examples of alternative types include flame-based thermal oxidizers (e.g., using oxygen as an oxidizer and hydrogen or methane as the fuel), catalytic oxidizers, transpirative oxidizers, etc. The thermal oxidizer may be heated in any suitable manner, such as by electrical resistance heating, infrared radiation, microwave radiation, convective heat transfer or solid conduction.

The thermal oxidization reactor 12 may as shown be equipped with a control thermocouple 24. The thermocouple is used to monitor the temperature of the heating element 18. The thermocouple may be arranged in suitable signal transmission relationship to a thermal energy controller (not shown). Such thermal energy controller may in turn be arranged to responsively modulate the electrical heating energy to the annular heating element 18, and thereby achieve a desired temperature of the hot wall surface of interior wall 20. In such manner, the wall surface can be maintained at a desired temperature level appropriate for the thermal oxidation treatment of the effluent flowed through the thermal oxidizer unit (in the direction indicated by arrow F in FIG. 1).

The thermal oxidation reactor 12 in the embodiment shown is adapted to receive clean dry air (CDA) from CDA supply line 26. The CDA supply line 26 may be joined in supply relationship to a suitable source of clean dry air (e.g., CDA source 72). The thus-introduced air flows into the annular space between outer wall 16 and inner wall 20 of the thermal oxidizer unit, and is heated to suitable temperature in contact with the annular heating element 18. Resultant heated air then may flow through orifices or pores in the inner wall 20 into the central flow passage 22 of the reactor. In such manner, the oxidant may be added to mix with the effluent gas an form an oxidizable effluent gas mixture for thermal oxidation in the reactor. Alternatively, the oxidant may be added at the inlet, as another introduced fluid stream, to support the oxidation reactions in the thermal oxidation reactor.

At its lower end, the thermal oxidizer unit 12 is joined to a quench inlet section 28 of quench unit 32. In the quench inlet section, an array of water spray nozzles 30 is provided, supplied with water by an associated water feed conduit, as shown. The water spray nozzles serve to provide initial quench cooling to the hot effluent gas stream as the stream is discharged from the thermal oxidizer unit into the quench unit.

The quench unit is arranged with the quench inlet section 28 joined to a transverse section 34 of the quench unit.

The transverse section 34 in turn is joined to the sump section 36 of the quench unit. The sump section 36 at its lower end is coupled to a slope drain/vapor barrier 38. A conductivity liquid level sensor/chamber purge assembly is joined to the sump section 36, and is coupled to CDA branch line 42 which provides clean dry air to the assembly.

At its upper end, the sump section 36 of the quench unit 32 is joined to the lower end of the scrubber demister column 44. The scrubber demister column is filled, in the lower secondary cooling/scrubbing section thereof, with a secondary scrubbing packing 46, and the upper portion of such section of the column is equipped with a water spray nozzle 48 for effecting scrubbing of the upflowing effluent gas therein, by countercurrently flowing water downwardly over the packing 46. The water spray nozzle 48 is supplied with water by water feed line 50.

The upper portion of the lower section of the scrubber demister column is equipped with a vapor relief port 52 to which is coupled a vapor relief line 54, for venting overpressure in the column. An exhaust temperature sensor 56 is mounted on the upper portion of the lower section of the scrubber demister column, to provide temperature monitoring capability for the column.

The upper section of the scrubber demister column is likewise filled with a secondary scrubbing packing 58 and is equipped with a water spray nozzle 60 coupled to water feed line 50. The water feed line 50 has an air operated valve 101 therein. The valve is normally in a closed condition, and may be actuated as necessary to provide additional scrubbing capability for treatment of a specific effluent gas stream.

The upper section of the scrubber demister column is coupled to an exhaust temperature sensor 62, for monitoring the temperature of the effluent gas stream. A magnehelic pressure display 64 is also joined to the upper section of the scrubber demister column. A clean dry air line 70 is joined to clean dry air source 72. The CDA line 70 supplies CDA to the column, e.g., for dilution of the effluent stream being discharged from the upper end of the column in the direction indicated by the arrow R. The CDA line 70 has a restricted flow orifice 68 therein and a flow control valve upstream of the orifice, for selectively restricting flow of CDA to the upper end of the column.

The inlet assembly 14 for delivery of process gases and ancillary fluids to the thermal oxidation reactor 12 is arranged as shown, with process gas inlet conduits 88 and 90 receiving process exhaust gas in lines 84 and 86 from the gas flow router/manifold 82, which in turn receives gas streams 76, 78 and 80 from the semiconductor manufacturing plant 74.

The semiconductor manufacturing plant 74 may be arranged to carry out any suitable operations for the production of semiconductor materials, devices and products. Examples of specific operations of such semiconductor manufacturing plant 74 may include one or more process steps, such as for example:

(a) ion implantation;
(b) epitaxial growth;
(c) plasma etching;
(d) reactive ion etching;
(e) metallization;
(f) physical vapor deposition;
(g) chemical vapor deposition;
(h) photolithography;
(i) cleaning; and
(j) doping.

Specific manufacturing operations may for example comprise photolithography steps in the manufacture of VLSI and ULSI circuits, epitaxial deposition of film materials such as silicon from dispensed Si source gases, ion implantation and doping in the fabrication of CMOS, NMOS, BiCMOS and other structures, and manufacture of devices such as DRAMs, SRAMs, FeRAMs, etc.

The semiconductor manufacturing plant 74 may be employed to fabricate electronic device structures such as for example:

(a) transistors;
(b) capacitors;
(c) resistors;
(d) memory cells;
(e) dielectric material;
(f) buried doped substrate regions;
(g) metallization layers;
(h) channel stop layers;
(i) source layers;
(j) gate layers;
(k) drain layers;
(l) oxide layers;
(m) field emitter elements;
(n) passivation layers;
(o) interconnects;
(p) polycides;
(q) electrodes;
(r) trench structures;
(s) ion implanted material layers;
(t) via plugs;
(u) precursor structures for the foregoing (a)–(t) electronic device structures; and
(v) device assemblies comprising more than one of the foregoing (a)–(t) electronic device structures.

With regard to products, the semiconductor manufacturing plant 74 may be constructed and arranged to produce electronic device structures. The products may for example comprise memory chip devices, such as:

(i) ROM chips;
(ii) RAM chips;
(iii) SRAM chips;
(iv) DRAM chips;
(v) PROM chips;
(vi) EPROM chips;
(vii) EEPROM chips; and
(viii) flash memory chips.

In the FIG. 1 effluent abatement system, the process gas inlet conduits 88 and 90 flow the influent process exhaust gas into the thermal oxidation reactor 12. These process gas inlet conduits are constructed with ancillary fluid addition lines 92 and 94, for addition of ancillary process fluids to the main effluent stream being flowed through the process gas inlet conduits 88 and 90.

The inlet assembly 14 also includes a shroud gas feed line 96 and a hydrogen source feed line 98. The hydrogen source feed line 98 is joined to a hydrogen source gas supply 100. The shroud gas may be a purge gas for the thermal oxidation reactor, or the inlet or associated piping and channels of the effluent abatement system. Illustrative shroud or purge gas species include nitrogen, helium, argon, etc.

In accordance with a preferred aspect of the present invention, water vapor (steam) is introduced as a hydrogen source gas to the thermal oxidation reactor 12. The water vapor is utilized at elevated temperature appropriate to the thermal oxidation process being carried out in the thermal oxidation reactor and the halogen components being abated in the effluent gas. The hydrogen source gas supply 100 therefore may comprise a vaporization unit that is supplied with water from a suitable feed source, such as a water line in the semiconductor manufacturing facility, a municipal or industrial water supply, or the like. The hydrogen source gas supply 100 may alternatively comprise a steam line in the semiconductor manufacturing facility or other source of water vapor. As a still further alternative, the hydrogen source gas supply 100 may comprise a chemical reaction vessel for reacting reagent materials to form water vapor. For example, a hydrocarbon reagent, such as methane, propane, natural gas, etc., may be introduced to the chemical reaction vessel for mixing and reaction with an independently introduced oxidant, e.g., an oxygen-containing gas such as air, oxygen, oxygen-enriched air, ozone, or the like, to produce water vapor as a reaction product.

Water vapor is employed in accordance with the present invention to provide a source of hydrogen in the thermal oxidation reactor, for reaction with the halogen constituents of the effluent gas. Although the invention is described hereinafter primarily in reference to fluorine and fluorinated species being the halogen components of interest, it will be appreciated that the invention is not thus limited, and extends in utility to the abatement of other halogens, e.g., bromine, iodine and chlorine, and to corresponding other halogen-containing compounds, complexes and radicals.

The invention therefore provides water vapor as a source of hydrogen gas for reaction with the halogen species, e.g., converting fluorine species to forms that are amenable to removal by wet scrubbing. For example, fluorine gas is readily converted by reaction with steam, to yield hydrogen fluoride, which is easily removed from the effluent gas in the scrubbing step. The scrubbing step also removes various other acid gas components of the effluent, to produce a halogen-reduced/acid gas-reduced effluent.

Fluorine in the effluent gas flowed into an effluent abatement system of the type shown in FIG. 1, with steam injection at the inlet of the reactor, will be abated in the upper section of the reactor.

In conventional systems comprising thermal oxidation treatment of the effluent followed by water scrubbing, but lacking the steam addition (or other hydrogen source injection/addition) capability of the system of the present invention, fluorine will be abated in the primary and secondary stages of the cooling and scrubbing sections, however, prior to being converted to HF, the reactive fluorine can corrode components in the thermal section of the thermal oxidation reactor. In some cases this has led to failure of the thermal section liners and primary cooling sections in less than two months. The most common failure mode in the liners is erosion of the center of the liner. For the primary cooling sections the failures are typically due to attack on the hot areas not contacted by the water quench.

The present invention overcomes these deficiencies. Introduction of steam as a hydrogen source at the inlet, as for example in line 98 in the system of FIG. 1, allows the reactive $F_2$ and fluorinated species to be reacted before they have a chance to attack the thermal section.

In preferred practice of the present invention, water vapor is injected between the stream of process gas and the liner of the thermal oxidation reactor, thereby protecting the liner from attack.

Figure 2:
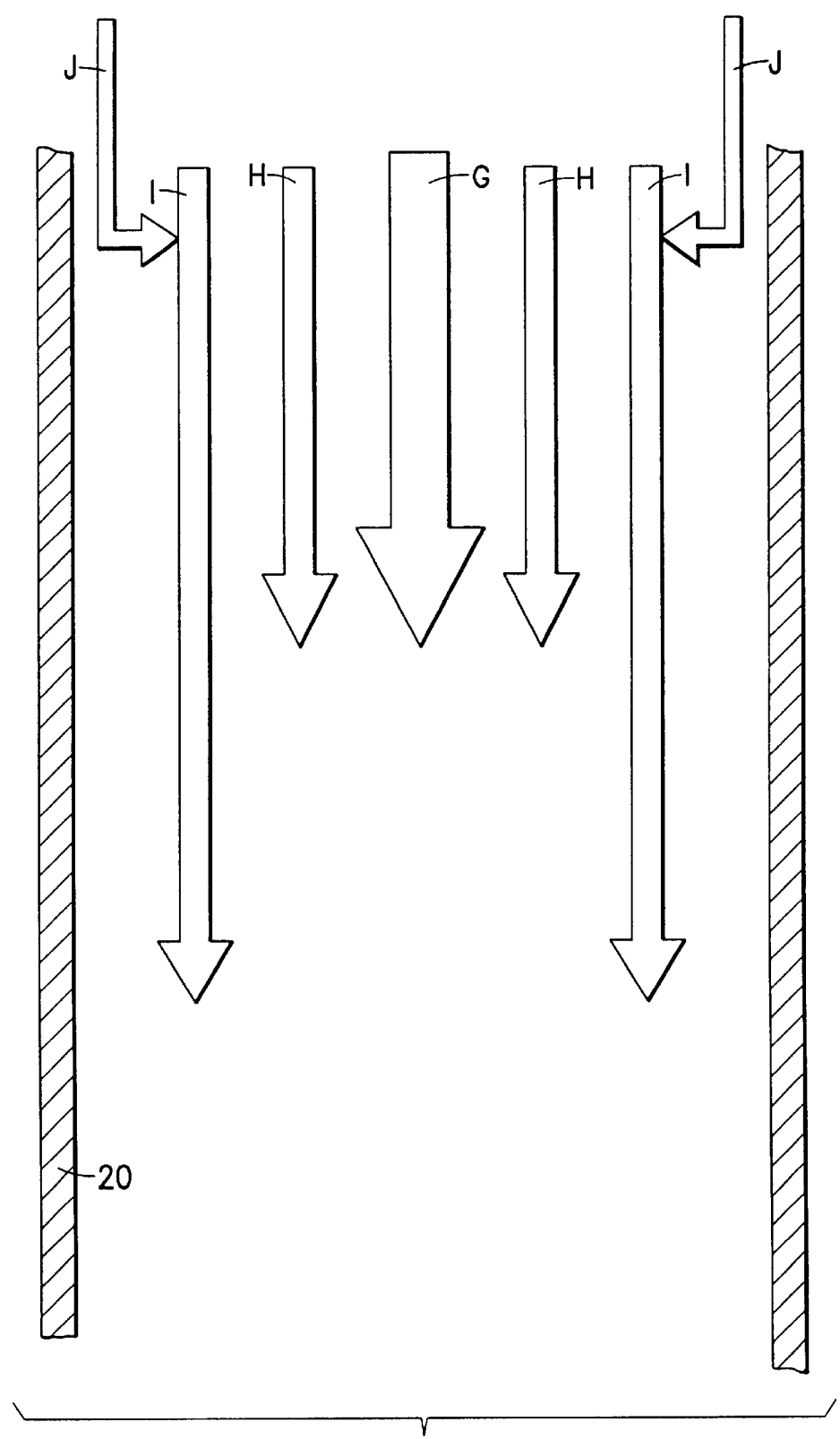
FIG. 2 is a schematic representation of gas flows in the inlet portion of a thermal oxidizer apparatus, according to one aspect of the invention.

Referring now to FIG. 2, there is shown a schematic representation of gas flows in the inlet portion of a thermal oxidizer apparatus (such as that shown in FIG. 1), according to one aspect of the invention.

FIG. 2 shows the liner 20 of the thermal oxidation reactor as bounding the central flow passage of the thermal oxidation reactor. A fluorine-containing effluent gas stream, indicated by the arrow G, is flowed from the inlet into and through the central flow passage of the thermal oxidation reactor.

Concurrent with the flow of the effluent gas stream through the inlet into the central passage of the thermal oxidation reactor, a shrouding gas, indicated by arrows H, is introduced, to surround the effluent gas stream in downflow through the central flow passage of the thermal oxidation reactor. The shrouding gas may for example be nitrogen, or other inert gas.

Concurrently, the inlet introduces water vapor, indicated by arrows I, for flow downwardly in the thermal oxidation reactor.

By such arrangement, the shrouding gas separates the effluent gas stream from the water vapor and prevents premature reactions that could otherwise generate solids and clog the gas feed tubes of the inlet. The water vapor may optionally be introduced with air or nitrogen mixture.

In the thermal section of the reactor, the hydrogen deriving from the steam will react with the fluorine or other halogen components of the effluent gas. The hot reaction products will be quenched in the primary section B (see FIG. 1) and will travel to the secondary sections C and D (see also FIG. 1) where they will be scrubbed.

In a variant of the foregoing water vapor introduction arrangement described above in connection with FIG. 2, the arrows I, instead of representing water vapor, may represent an alternative hydrogen source material, such as methane. Concurrently, oxygen, air or other oxygen-containing gas, indicated by arrow J, may be introduced to the thermal oxidation reactor for reaction with the methane or other hydrogen source material, to produce water vapor as a reaction product, for reaction with fluorine and fluorinated species. The nitrogen or other inert gas indicated by arrow H will serve the same function in this variant arrangement, of separating the effluent from the water vapor (and methane combustion products).

Figure 3:
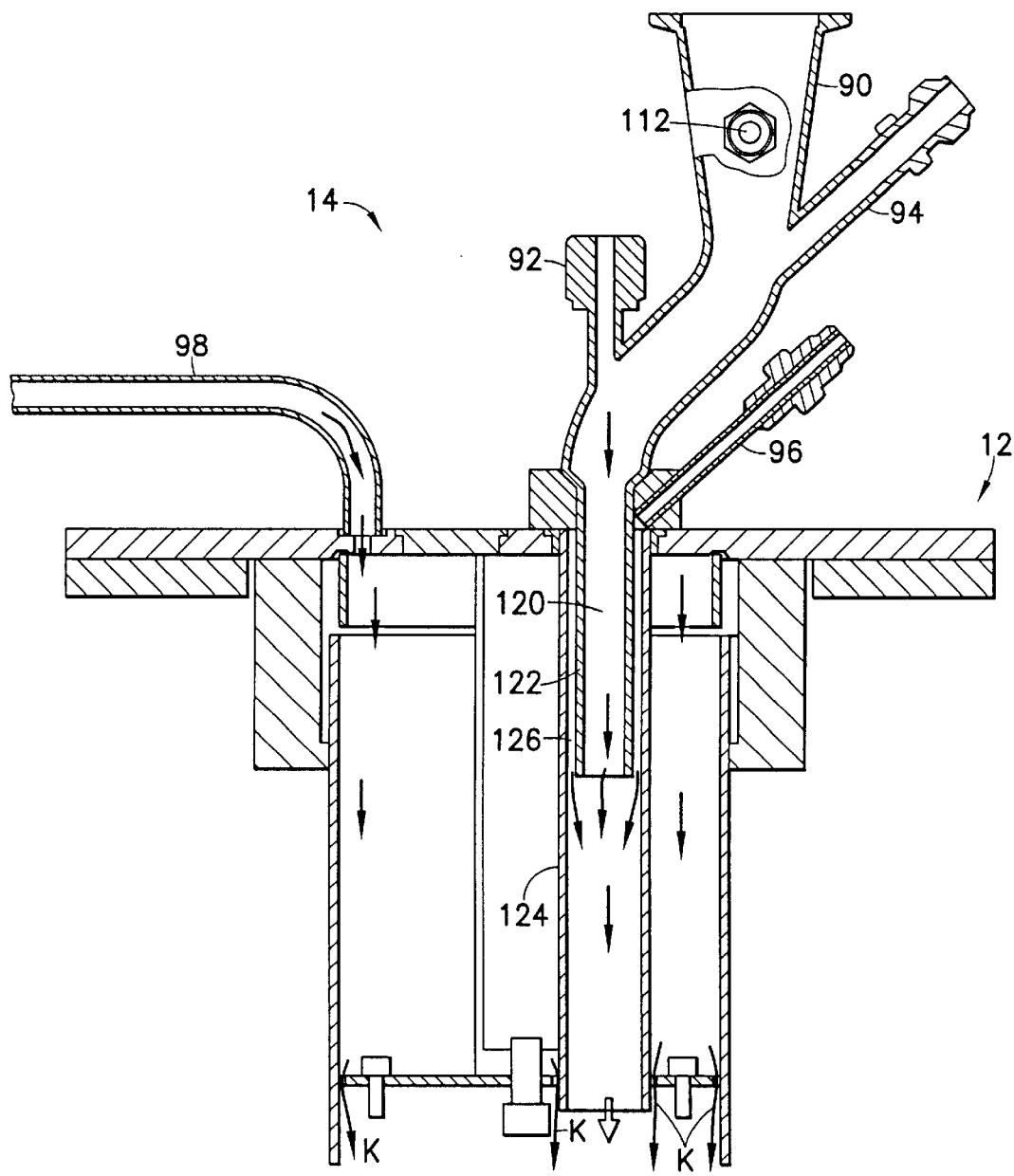
FIG. 3 is a cross-sectional elevation view of an inlet of a thermal oxidizer unit, according to one embodiment of the invention.

FIG. 3 is a cross-sectional elevation view of an inlet of a thermal oxidizer unit of the type shown in FIG. 1, according to one embodiment of the invention. For ease of description, the same reference numerals are used in FIG. 3 as employed for the corresponding elements in FIG. 1.

As shown in FIG. 3, the inlet structure 14 includes a process gas inlet conduit 90 for introducing effluent gas from a process facility, such as a semiconductor manufacturing tool, to a thermal oxidation reactor 12.

The process gas inlet conduit 90 features an inlet pressure monitoring port 112 for coupling with a suitable pressure monitoring device to sense the pressure of the process gas. The process gas inlet conduit 90 is provided with fluid addition lines 92 and 94, for addition of oxygen, air, nitrogen, and/or any other gas species, to assist the thermal oxidation reaction in the reactor 12. For example, the fluid addition lines may be employed to add a co-reactant species for specific components of the effluent gas being treated.

The process gas inlet conduit 90 terminates in a lower tubular wall 122 enclosing a cylindrical flow passage 120, within an outer tubular wall 124. The outer tubular wall 124 is in spaced relationship to tubular wall 122, defining an annular space 126 therebetween.

Communicating with annular space 126 is a shroud gas feed line 96, to which shroud gas such as nitrogen is introduced, for downward flow around the discharged effluent gas in the central flow passage defined by outer tubular wall 124. The outer tubular wall 124 thus defines an effluent flow passage and is open-ended at its lower end.

Water vapor is introduced in hydrogen source gas feed line 98 and flows downwardly, exiting the inlet structure at its lower end as indicated by arrows K. Subsequently, in flow below the inlet 12, in the thermal oxidation reactor, the water vapor mixes with the effluent gas and fluorine and fluorinated species in the effluent gas are reacted with hydrogen deriving from the injected water vapor. Hydrogen fluoride and other reaction products thereby are formed, which are readily removable in the subsequent scrubbing operation of the effluent treatment system.

Instead of water vapor, methane or other hydrogen source gas may be introduced in line 98 to the inlet. For example, if methane is introduced in line 98, then oxygen, air, or other oxygen-containing gas may be concurrently introduced in the same line, or in a different line of the inlet, e.g., in line 92 or line 94. A steam generator may additionally be coupled with hydrogen source gas feed line 98, to provide hydrogen for reaction with the halogen in the effluent gas.

Figure 4:
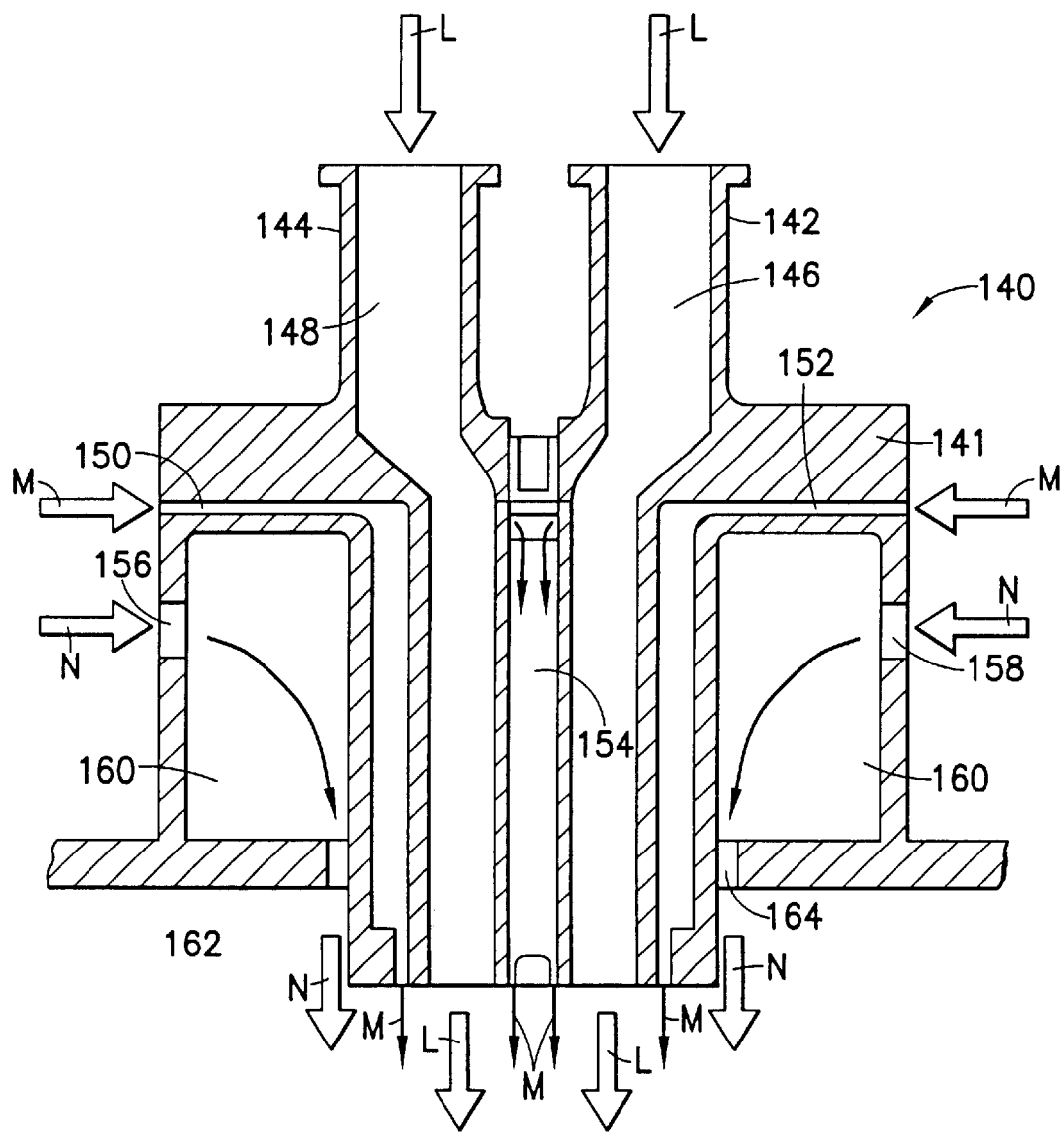
FIG. 4 is a cross-sectional elevation view of an inlet of a thermal oxidizer unit, according to another embodiment of the invention.

FIG. 4 is a cross-sectional elevation view of an inlet 140 of a thermal oxidizer unit, according to another embodiment of the invention. The inlet comprises an inlet body 141 constructed with a first tubular feed conduit 142 and a second tubular feed conduit 144, defining enclosed interior passages 146 and 148, respectively. Effluent gas, indicated by arrows L, is introduced to the first tubular feed conduit 142 and second tubular feed conduit 144, for flow through the inlet into the thermal oxidation reactor.

The inlet body 141 also comprises nitrogen feed passages 150 and 152, through which nitrogen gas, indicated by arrows M, is flowed. These nitrogen feed passages communicate with central nitrogen feed passage 154. As shown, at the bottom of the inlet body, the nitrogen gas (arrows M) flows downwardly as a shrouding gas for the effluent gas stream (arrows L).

Concurrently, a hydrogen source gas is introduced to the inlet body by hydrogen source gas passages 156 and 158, for entry into the annular hydrogen source gas reservoir 160. The hydrogen source gas is flowed from the reservoir through the hydrogen source gas outlet slots 162 and 164, and flows downwardly (arrows N) around the effluent gas stream (arrows L), so that the effluent gas stream is shrouded by the shrouding gas stream (arrows M), to thereby prevent premature reaction between the effluent gas and the hydrogen source gas.

Subsequently, as the gas streams (arrows L, M and N) pass downwardly, the respective streams mix and the hydrogen source gas reacts with the fluorine and fluorinated species in the effluent gas stream, to abate the fluorine content thereof.

In the broad practice of the invention, the relative flow rates of the hydrogen source gas and the effluent gas stream may be suitably selected so as to minimize the incidence of corrosion of the liner in the thermal oxidation reactor and to effect the desired reaction and removal of the halogen content of the effluent gas stream being treated.

The same is true of the shrouding gas used to protect the effluent gas from premature reaction with the hydrogen source gas.

The relative rates of flow of all gas streams in a given treatment application may be readily determined without undue experimentation, by the simple expedient of independently varying the flow rate of each stream in sequence and determining the corresponding destruction removal efficiency (DRE) of the halogen component(s) of interest in the treated effluent gas.

Suitable temperature and pressure levels for the effluent abatement process of the invention can be similarly determined, to achieve a desired level of abatement of the halogen component in the effluent gas.

Preferred temperatures for the use of water vapor or $CH_4$ as a hydrogen source reagent are between 650° C. and 950° C., with the lower temperatures decreasing the corrosion rate and $F_2$ attack on the liner.

The invention will therefore be appreciated as providing a simple and effective technique for the abatement of fluorine and fluorinated species, as well as of other halogen species, from effluent gases generated in industrial processes, such as manufacturing of semiconductor materials, devices and products. The features and advantages of the invention will be more fully apparent from the following non-limiting examples.

EXAMPLE 1

$F_2$ abatement from an effluent derived from a semiconductor manufacturing plant was evaluated in a Delatech CDO™ thermal oxidation unit (Ecosys Corporation, San Jose, Calif.), using $NH_4OH$ as the abatement reagent.

$F_2$ abatement from a corresponding effluent was evaluated using water flushed through the $NH_4OH$ injection lines of the thermal oxidation reactor.

The Destruction Removal Efficiency (DRE) for $F_2$ when water was flushed through the $NH_4OH$ injection lines was between DRE value for $NH_4OH$ reagent and the DRE value when no reagent was used.

The improved DRE for water flushing relative to performance with no $F_2$ abatement reagent indicated that some of the $F_2$ was being abated by the water in the heated section of the CDO™ thermal oxidation reactor. Table 1 below shows the fluorine abatement with injection of water into the inlet section of the thermal oxidation reactor.

TABLE 1. Fluorine abatement with injection of water into thermal oxidation reactor inlet section.

| $NH_3$ aq. g/min | $H_2O$ g/min | $NH_3$ in slpm | $F_2$ in slpm | Total Flow slpm | Water pH | $F_2$ in (ppm) | $F_2$ out (ppm) | $F_2$ DRE % |
|---|---|---|---|---|---|---|---|---|
| 4.0 | 2.9 | 1.6 | 2.0 | 182 | 3.4 | 11,013 | 1 | 99.99 |
| 0.0 | 4.0 | 0.0 | 2.0 | 180 | 3.3 | 11,111 | 3 | 99.97 |
| 0.0 | 4.0 | 0.0 | 2.0 | 172 | 3.2 | 11,628 | 10 | 99.91 |
| 0.0 | 0.0 | 0.0 | 2.0 | 172 | 3.2 | 11,628 | 40 | 99.66 |

EXAMPLE 2

Long term testing with $NH_4OH$ as a $F_2$ abatement reagent revealed a problem with corrosion on the bottom of the inlet section of the thermal oxidation reactor. This corrosion was traced to cooling by the $NH_4OH$ being vaporized in the inlet section. To prevent this cooling due to the change of state from liquid to vapor, a heater was installed before the inlet section to vaporize the incoming $NH_4OH$ prior to injection. This heater consisted of a tubular housing with a heating element inside the housing. The $NH_4OH$ was metered, mixed with air and entered the side of the housing where it was vaporized by the heater element. The $NH_4OH$ vapor mixed with air exited the housing and flowed to the inlet assembly. This modification resolved the corrosion problem. $NH_4OH$ may be employed as an adjunctive fluorine abatement agent in the broad practice of the present invention.

EXAMPLE 3

A fluorine abatement effluent treatment system of the type shown in FIG. 1 and equipped with an inlet of the type shown in FIG. 3 is operated, to effect treatment of an effluent gas stream from a semiconductor manufacturing facility. Water vapor is used as the fluorine abatement agent. The process gas flows down the center tube, with $N_2$ flowing into the surrounding tube and out the annulus formed by the two concentric tubes. This $N_2$ flowing out the annulus separates the process gases from the water vapor and prevents premature reactions that could generate solids and clog the inlet tubes. The water is vaporized into steam using the same heater used for the $NH_4OH$ testing in Example 2. The steam and air or $N_2$ mixture is introduced into the hydrogen source gas feed tube to flow around the tube carrying the effluent gas and mix with the process gases in the thermal section of the CDO™ thermal oxidation reactor. The hot reaction products are quenched in the primary section and travel through the secondary section where they are scrubbed.

EXAMPLE 4

Another test is conducted using the combustion of $CH_4$ in air or $O_2$ to generate water vapor to react with the $F_2$ and fluorinated species. In this case the same inlet configuration as shown in FIG. 3 is used. The process gases flow through the same center tube as in the water vapor injection in Example 3. $CH_4$ is injected. The flow of $N_2$ separates the process gases from the water vapor and $CH_4$ combustion products. $O_2$ or clean dry air (CDA) is added to support the combustion of the $CH_4$.

While the invention has been described with reference to illustrative embodiments, it will be recognized that other variations, modification and other embodiments are contemplated, as being within the spirit and scope of the invention, and therefore the invention is to be correspondingly broadly construed with respect to such variations, modifications and other embodiments, as being within the spirit and scope of the invention as claimed.

We claim:

1. A method for treating an effluent fluid stream comprising one or more halogen-containing components from one or more semiconductor manufacturing process tools, using a system that includes an oxidizing unit having one or more inlet units at one end and a gas flow path susceptible to corrosion in exposure to said effluent fluid stream, comprising the steps of:

introducing said effluent fluid stream to the oxidizing unit through the inlet end;

providing water vapor to the inlet end for mixing with the effluent fluid stream in said oxidizing unit;

effecting, at the inlet end of the oxidizing unit, the conversion of at least a portion of the halogen-containing components of the effluent fluid stream to a form that is more treatable using said water vapor; and effecting, in the oxidizing unit, the oxidation of at least a portion of the oxidizable components of the effluent fluid stream, wherein the water vapor flows between the introduced halogen-containing effluent fluid stream and interior wall of the gas flow path of said oxidizing unit to thereby project said gas flow path from corrosion.

2. The method for treating the effluent fluid stream from one or more semiconductor manufacturing process tools using a system that includes an oxidizing unit having one or more inlet units at one end of claim 1, further comprising the step of removing water-soluble components and particulates prior to effecting oxidation and conversion.

3. The method for treating the effluent fluid stream from one or more semiconductor manufacturing process tools using a system that includes an oxidizing unit having one or more inlet units at one end of claim 1, further comprising removing acidic components from the effluent fluid stream.

4. The method for treating the effluent fluid stream from one or more semiconductor manufacturing process tools using a system that includes an oxidizing unit having one or more inlet units at one end of claim 1, wherein the step of providing water vapor to the inlet end of the oxidizing unit comprises the steps of:

vaporizing water;

injecting the water vapor at the inlet end of the oxidizing unit.

5. The method for treating the effluent fluid stream from one or more semiconductor manufacturing process tools using a system that includes an oxidizing unit having one or more inlet units at one end of claim 1, wherein the water vapor is utilized to provide a hydrogen source to effect said conversion, and heat is used to keep the surfaces in the oxidizing unit above dew point and overcome the latent heat of vaporization of water.

6. The method for treating the effluent fluid stream from one or more semiconductor manufacturing process tools using a system that includes an oxidizing unit having one or more inlet units at one end of claim 1, wherein the step of providing water vapor to the inlet end of the oxidizing unit comprises the steps of:

injecting hydrocarbon gas and clean dry air (or oxygen) at the inlet end of the oxidizing unit; and mixing the hydrocarbon gas and clean dry air at the inlet end of the oxidizing unit.

7. The method for treating the effluent fluid stream from one or more semiconductor manufacturing process tools using a system that includes an oxidizing unit having one or more inlet units at one end of claim 1, further comprising the step of:

injecting a purge gas into the oxidizing unit at the one or more inlet units.

8. The method for treating the effluent fluid stream from one or more semiconductor manufacturing process tools using a system that includes an oxidizing unit having one or more inlet units at one end of claim 7, wherein the purge gas is selected from the group consisting of nitrogen, clean dry air, and other inert gases.

9. The method for treating the effluent fluid stream from one or more semiconductor manufacturing process tools using a system that includes an oxidizing unit having one or more inlet units at one end of claim 1, wherein the step of effecting oxidation comprises the steps of:

mixing the effluent fluid stream with an oxidizer medium; and heating the effluent fluid stream.

10. The method for treating the effluent fluid stream from one or more semiconductor manufacturing process tools using a system that includes an oxidizing unit having one or more inlet units at one end of claim 9, wherein the oxidizer medium is already present in the effluent fluid stream.

11. The method for treating the effluent fluid stream from one or more semiconductor manufacturing process tools using a system that includes an oxidizing unit having one or more inlet units at one end of claim 9, wherein the step of mixing the effluent fluid stream with an oxidizer medium comprises the step of:

injecting clean dry air downstream of the inlet end of the oxidizing unit.

12. The method for treating the effluent fluid stream from one or more semiconductor manufacturing process tools using a system that includes an oxidizing unit having one or more inlet units of claim 9, wherein the effluent fluid stream is heated to within the temperature range of about 650° C. to 950° C.

13. The method for treating the effluent fluid stream from one or more semiconductor manufacturing process tools using a system that includes an oxidizing unit having one or more inlet units at one end of claim 1, wherein the semiconductor manufacturing process tools comprise high density plasma chemical vapor deposition tools which use a remote plasma source to effect disassociation of diatomic halogen from halogen containing gases in the effluent fluid stream.

14. A method of thermally oxidizing a halogen-containing effluent gas in a thermal oxidation reactor including a gas flow path bounded by a liner susceptible to corrosion in exposure to halogen species in the halogen-containing effluent gas, said method comprising introducing the halogen-containing effluent gas into the thermal oxidation reactor and flowing water vapor between the introduced halogen-containing effluent gas and the liner to thereby protect the liner by reaction of the water vapor with the halogen species in the halogen-containing effluent gas.

15. The method of claim 14, further comprising flowing a shrouding gas between the water vapor and the halogen-containing effluent gas introduced to the gas flow path of the thermal oxidation reactor.

16. The method of claim 15, wherein the shrouding gas comprises nitrogen.

17. The method of claim 14, wherein the water vapor is formed in situ in the thermal oxidation reactor by combustion of a hydrocarbon and an oxidant.

18. The method of claim 14, wherein the halogen-containing effluent gas contains fluorine and/or fluorinated species therein.

19. The method of claim 14, wherein the halogen-containing effluent gas is generated by a semiconductor manufacturing plant.

20. The method of claim 19, wherein the semiconductor manufacturing plant uses at least one perfluorinated compound manifesting halogen in the halogen-containing effluent gas.

21. The method of claim 14, wherein the halogen-containing effluent gas contains a diatomic halogen species therein.

22. The method of claim 21, wherein the diatomic halogen species is selected from the group consisting of $Cl_2$, $F_2$, $I_2$, and $Br_2$.

23. A method of thermally oxidizing a halogen-containing effluent gas in a thermal oxidation reactor including a gas flow path bounded by a liner susceptible to corrosion in exposure to halogen species in the halogen-containing effluent gas, said method comprising introducing the halogen-containing effluent gas into the thermal oxidation reactor and flowing water vapor between the introduced halogen-containing effluent gas and the liner to thereby protect the liner by introducing and simultaneously mixing the water vapor with the halogen species in the halogen-containing effluent gas.

* * * * *

UNITED STATES PATENT AND TRADEMARK OFFICE
CERTIFICATE OF CORRECTION

PATENT NO. : 6,423,284 B1 Page 1 of 1
DATED : July 23, 2002
INVENTOR(S) : Jose I. Arno et al.

It is certified that error appears in the above-identified patent and that said Letters Patent is hereby corrected as shown below:

<u>Title page,</u>
Item [75], Inventors, delete the incorrect spelling of "Robert M. Vermeulen" and replace with the correct spelling of -- Robbert M. Vermeulen --

<u>Column 12,</u>
Line 54, delete the word "project" and substitute -- protect --.

Signed and Sealed this

Tenth Day of February, 2004

JON W. DUDAS
*Acting Director of the United States Patent and Trademark Office*